(12) United States Patent
Gneuss

(10) Patent No.: US 7,411,163 B2
(45) Date of Patent: Aug. 12, 2008

(54) DEVICE FOR PROVIDING A MELT

(75) Inventor: Detlef Gneuss, Bad Oeynhausen (DE)

(73) Assignee: Gneuss Kunststofftechnik GmbH, Bad Oeynhausen (DE)

( * ) Notice: Subject to any disclaimer, the term of this patent is extended or adjusted under 35 U.S.C. 154(b) by 20 days.

(21) Appl. No.: 10/544,891

(22) PCT Filed: Jun. 9, 2004

(86) PCT No.: PCT/EP2004/006234

§ 371 (c)(1),
(2), (4) Date: Aug. 5, 2005

(87) PCT Pub. No.: WO2004/108393

PCT Pub. Date: Dec. 16, 2004

(65) Prior Publication Data

US 2006/0157879 A1    Jul. 20, 2006

(30) Foreign Application Priority Data

Jun. 10, 2003 (DE) .............................. 103 26 487

(51) Int. Cl.
*H05B 1/02* (2006.01)

(52) U.S. Cl. ............... 219/497; 219/496; 219/494; 210/409; 425/197; 425/378.1

(58) Field of Classification Search ............ 219/494, 219/497, 499, 501, 505, 496; 210/91, 409, 210/411, 791, DIG. 15; 425/197–199, 378.1, 425/381.2, 376.1, 382.3

See application file for complete search history.

(56) References Cited

U.S. PATENT DOCUMENTS

| | | | |
|---|---|---|---|
| 4,332,541 A | * | 6/1982 | Anders ...................... 425/197 |
| 4,832,882 A | | 5/1989 | Moylan |
| 4,944,903 A | | 7/1990 | Nilsson |
| 6,270,703 B1 | * | 8/2001 | Wildman et al. ............. 264/39 |

FOREIGN PATENT DOCUMENTS

| | | |
|---|---|---|
| DE | 90 04 535 | 9/1990 |
| DE | 101 50 796 | 4/2003 |
| EP | 0 492 425 | 7/1992 |
| EP | 1 208 956 | 5/2002 |
| WO | 01/43847 | 6/2001 |

* cited by examiner

*Primary Examiner*—Mark Paschall
(74) *Attorney, Agent, or Firm*—Friedrich Kueffner

(57) ABSTRACT

The invention relates to a device (1) for providing a melt, in particular a plastic melt. Said device (1) comprises a feed unit (2) for material components, at least one purification unit (4) for the flowing melt, in particular a rotatable screening disc (5), and at least one sensor unit (17; 18; 19; 20; 21) for detecting one or more process parameters. The operation of the purification unit (4) can be influenced with the aid of said sensor unit, based on the filter-specific process data. The inventive device is configured in such a way that at least the type and dosage of the process materials that are supplied via the feed unit (2) and/or the processing parameters of said process materials can be controlled using the detected (17; 18; 19; 20; 21) process parameters and/or the filter-specific process data.

8 Claims, 2 Drawing Sheets

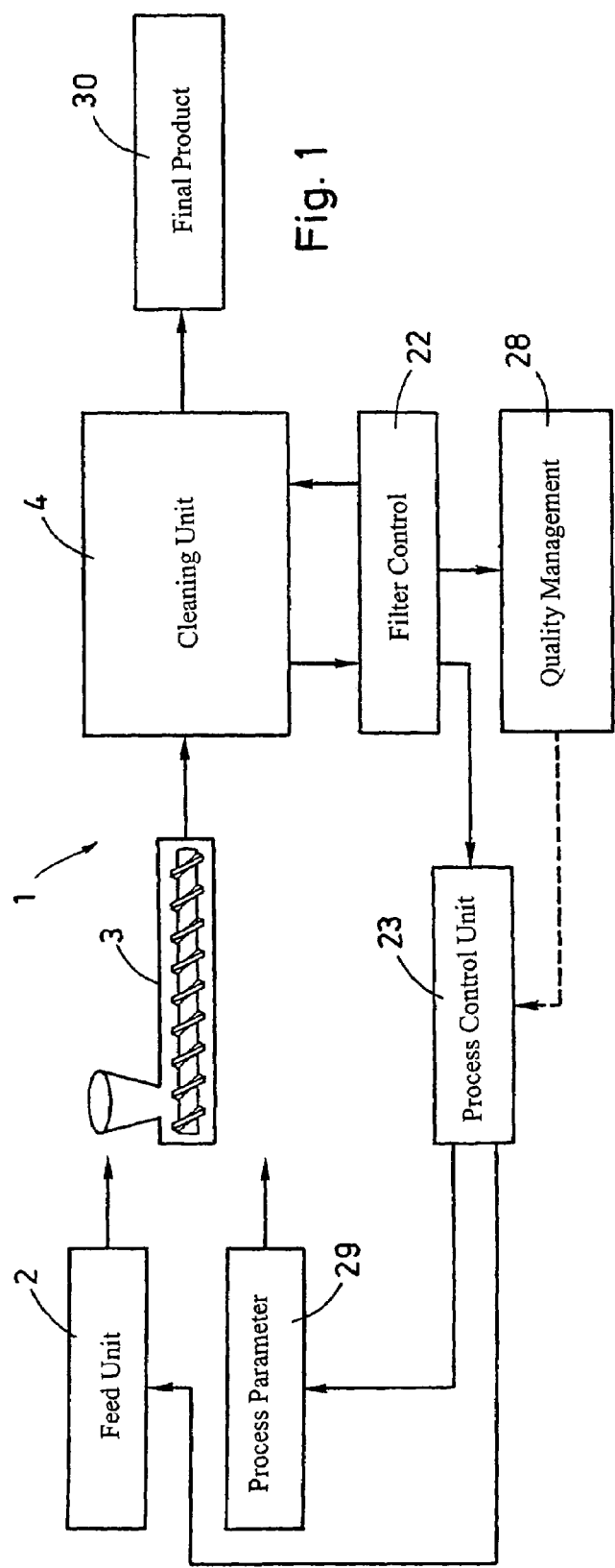
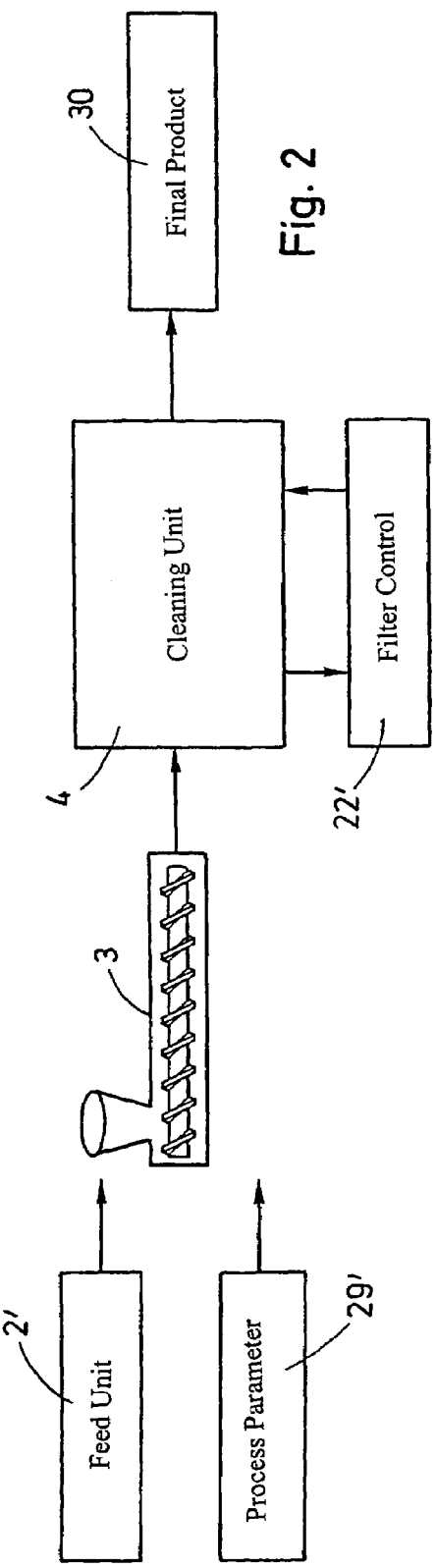

DEVICE FOR PROVIDING A MELT

The invention pertains to a device with a cleaning unit for preparing a melt, so that, for example, this melt can be subjected to further processing in a plastic processing machine or the like, in accordance with the introductory clause of claim 1.

These types of devices are used to remove impurities mechanically from plastic melts before they are subjected to further processing in, for example, extruders. For this purpose, such a device has, for example, a cleaning unit with a metal screen disk, which is provided with several screen inserts, which are arranged in a circumferential row around the disk. The screen inserts themselves are subjected to a cleaning process after a certain operating time to remove the dirt which clogs the hole passages. If this cleaning were to be omitted, considerable back-pressure would quickly build up as a result of the clogged areas of the screen, which in turn would interfere with the cleaning function which the screen performs for the melt.

It is known from WO 01/43,847 that a cleaning stream can be directed at the screen inserts to clean them, this stream proceeding in the direction opposite that which the melt normally takes on its way through the screen disks. This counterflow is produced in a back-flush channel which branches off from the main melt channel. To optimize the self-cleaning of the screen disks as a function of the degree of contamination, a control device is proposed there, which determines the melt volume or the flow velocity of the back-flushing melt, the input variables of the control device being formed on the basis of process parameters determined during operation. The only way in which a device of this type can react to changes in the quality of the feed components, however, is to adjust the cleaning action of the screen inserts. Although the screen inserts may be fulfilling their function, it is therefore still possible under certain conditions, such as in the presence of aggregations of carbon black, that the output composition of the melt will not meet the desired requirements.

The invention is based on the task of improving a device of the type indicated above with respect to its possible uses.

The invention accomplishes this task by a device with the features of claim 1 and by a device with the features of claim 2, which can be realized individually or in combination with each other. See the additional claims 3-6 for advantageous embodiments.

According to the invention, it becomes possible with the design according to claim 1 to react to measured parameters and possibly to filter-specific process data determined from those parameters by changing the process materials being supplied and/or the composition of the process materials and/or the processing parameters of those materials, as a result of which it is possible to guarantee a product of uniform quality on the output side.

In the embodiment according to claim 2, on the other hand, it is possible, even if the properties of the product are not completely uniform, to adjust the conditions under which further processing is carried out. If the viscosity of the melt increases, for example, such adjustments could involve the expansion of the cross sections of flexible pipelines in the device or in a downline unit for further processing or the lengthening of the valve opening times to keep the flow velocity of the melt and thus the process management constant despite the increase in the viscosity of the melt.

It is especially advantageous for the control of the work of the cleaning unit and the control of the composition of the feed components to depend on each other as a function of the data determined by the sensor unit. Let it be assumed, for example, that the sensor unit detects an insufficient amount of carbon black in the melt and thus an insufficient black coloration. Because clumps of carbon black may be present on the filter input side, the self-cleaning action of the screen filter can be increased, and because the screen filter is obviously holding back too much carbon black, which is therefore not available for coloring the product, the percentage of carbon black in the feed components can be increased. It is therefore possible in this way to deal with feed components of different qualities.

Additional advantages and features of the invention can be derived from an embodiment of the object of the invention, which is shown in the drawing and described below:

FIG. 1 shows a schematic functional block diagram of an inventive device;

FIG. 2 shows a diagram similar to FIG. 1 of a conventional device for preparing a melt;

Figure 3:
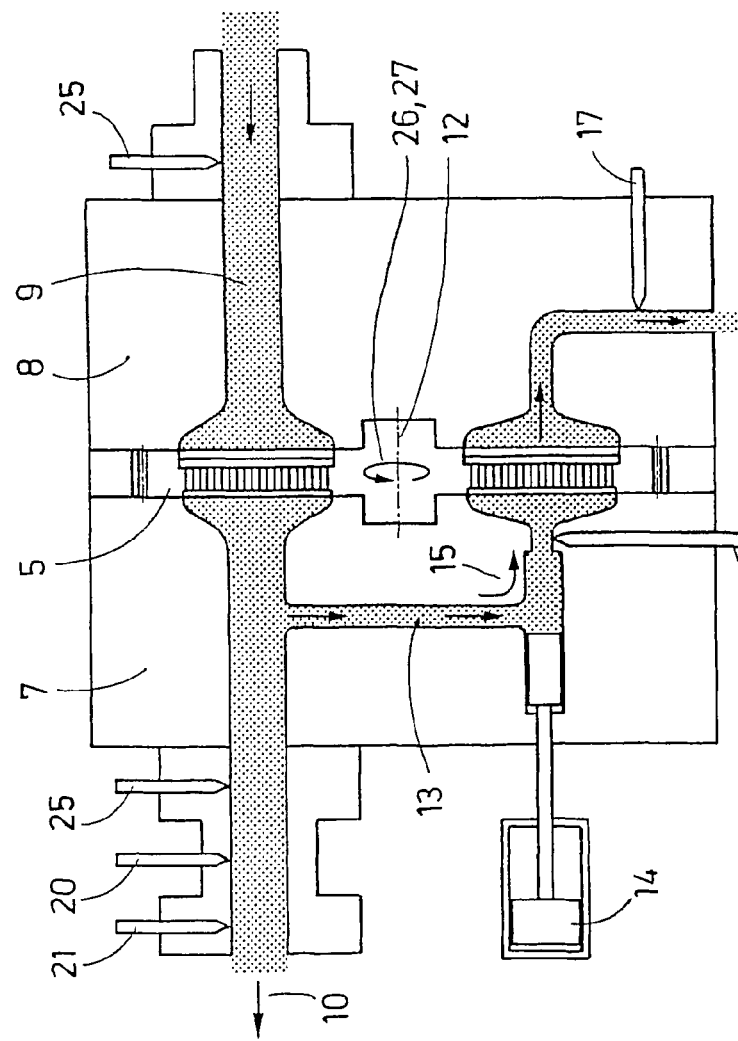
FIG. 3 shows a cross-sectional view of the part of the device which contains the cleaning unit.

FIG. 1 shows a functional block diagram of a device 1, which realizes the features of both claim 1 and claim 2. The device 1 comprises a feed unit 2 for the input of various components such as fresh granulate, plastic recyclate, a masterbatch, or additives such as chalk, sawdust, colorant, etc. The components are supplied by way of a suitable plasticizing unit 3, consisting here of a hopper and a screw conveyor, to at least one cleaning unit 4. As shown here, this unit can comprise a screen disk 5, which is provided with several screen inserts 6. It is typical to use approximately ten to fourteen screen inserts 6, which can be replaceable. The screen disk 5 is held between two parallel plate-like bodies 7, 8 in the cleaning position inside a cleaning channel 9, where an access opening 11 for access to the screen disk 5 is provided in the flow direction 10 of a cleaning fluid (FIG. 3).

Figure 4:
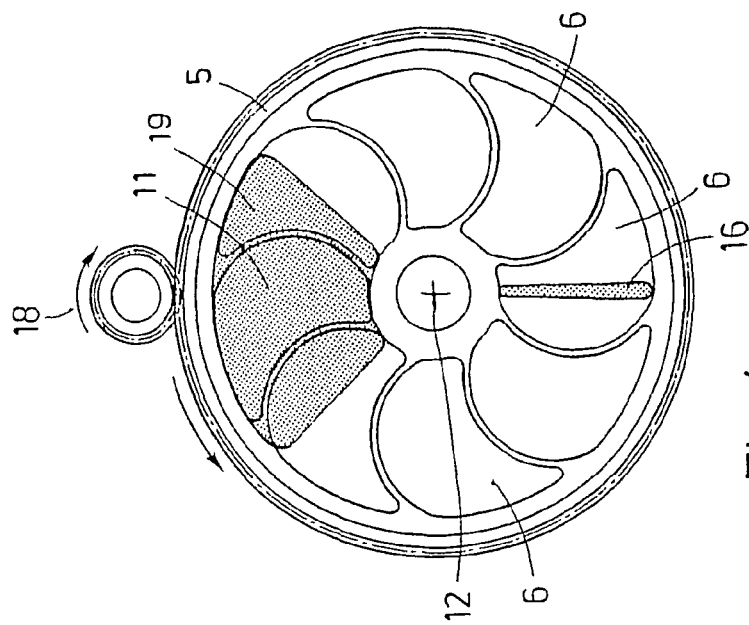
FIG. 4 shows a cross section along line IV-IV in FIG. 3.

In the exemplary embodiment, the screen disk 5 has a circular outline (FIG. 4), and the access opening 11 has at least a considerable dimension in the radial direction of the screen disk 5, extending to its outer edge. The screen disk 5 can be rotated around a central axis 12, so that the screen inserts 6 can arrive one after the other in the area covered by the access opening 11.

A back-flush line 13 branches off from the melt channel 9. In this line, the melt which has passed through the screen filter 5 can be forced by a melt shot piston 14 through a slit-like area 16 of the melt filter 5 in the direction 15 opposite the flow direction 10 to clean out the clogged holes in the screen inserts 6. Thus the melt filter 5 can clean itself during normal operation. As a result of the continuous or stepwise rotation of the disk around the axis 12, furthermore, part of the filter will always be located in the self-cleaning position and part in the filter position for the melt. Areas which have become at least partially clogged while in the filter position can be advanced directly to the cleaning position.

The device 1 also comprises several sensor units 17, 18, 19, 20, 21, which detect the various parameters which are used not only to control the function of the filter unit but also to influence the efficiency and quality of the device 1.

The sensor unit 17 is mounted on the cleaning channel 9 and measures the amount of dirt discharged from the screen filter 5 as a result of the back-flushing. The sensor units 18 and 19 are assigned to the screen filter 5. The former measures the drive torque required to rotate the disk around the axis 12; the latter measures the amount of screen surface area which has been used up or the required filter area capacity during the cleaning of the melt. The sensor units 20 and 21, furthermore, measure the viscosity of the cleaned melt and evaluate the melter unit. Additional measurement parameters such as temperature, pressure, electrical conductivity of the melt, etc., can be determined either as alternatives or in addition to those just mentioned.

The data determined by the sensor units and possibly the data calculated from them by computer modules are transmitted first, as in the state of the art (FIG. 2), to a filter control unit 22, by means of which the movement of the screen filter 5 can be adjusted. According to the invention, however, the data are also sent to a process control unit 23, which fulfills two functions: First, it uses the data obtained to control the composition of the components in the material input in such a way that, for example, it reduces the supply of one of the components in the melt which has been found to be excessive on the basis of high density values or the wrong electrical conductivity; second, the process control unit 23 controls the process parameters 29 such as for example, the viscosity for the device 1 itself, as presented here, and/or for at least one additional processing unit downline from the device 1, such as a chopper, a valve, an extruder, etc. The supplied components can be recyclates or fresh materials or even a mixture of the two, and they can also contain various fillers.

In particular, the control commands for the material input and the filter control commands are transmitted in coordination with each other. When, for example, low-grade carbon black which agglomerates or forms clumps is used as an input component, these carbon black clumps will remain stuck in the screen filter 5 and will not contribute, as desired, to the blackening of the end product. The screen filter 5 therefore becomes clogged more quickly, and the filter control unit 22 thus gives the command to speed up the self-cleaning of the filter 5, that is, to accelerate the rotation of the disk around the axis 12. At the same time, however, the defective nature of the product itself—in this case, it is not black enough—would be detected by, for example, the sensor units 20, 21 downstream from the screen filter 5, and the process control unit 23 would then tell the material input to increase the percentage of the carbon black component.

Limit values are built into the control system, which, for example, prevent the screen filter 5 from rotating too quickly and prevent any one component from being metered into the melt in excessive amounts. Under certain conditions, an alarm can be triggered or the system can be automatically shut down.

In addition to the sensors 17, 18, 19, 20, 21, various control elements 24, 25, 26, 27 are also provided, which make it possible to control the process parameters of the device 1. This in turn makes it possible to adjust the system behavior to deal with detected changes during operation. For example, an actuator 24 designed as a valve can adjust the back-flushing pressure, and the actuator 25 can be used to adjust the pressure drop across the screen disk 5. The actuators 26, 27 assigned to the axis of rotation 12 ensure that the time which the melt spends at the screen filter 5 and the time which the dirt cake spends on the screen filter do not exceed the predetermined limit values.

It is obvious that there are various ways in which the process can be influenced by the process control unit 23 and the associated actuators.

Overall, therefore, the whole process can be controlled, not just the parameters of the filter unit. It is also possible for this control to be fully automatic. There is no longer any need for manual intervention.

Because the metering of the input components and also the process parameters can be adjusted to optimum values automatically, the additional advantage is obtained that the filter can be used to maximum capacity.

The data determined by the one or more sensor units 17, 18, 19, 20, 21 represent automated information which, when they indicate, for example, a quality problem with one of the input components, can not only be used to influence the process itself but also sent simultaneously or after a delay to the quality management department 28 and/or to the purchasing department, so that a higher-quality version of the component in question can delivered the next time.

It is also possible, however, to classify and to assign the finished product 30 in an appropriate manner.

The acquisition of all these essential data and the logical evaluation of the process data which result from the filter-specific control system make it possible in addition to exercise comprehensive and above all fully automatic process control of the entire production process.

The condition on which such a complex control system is based is a filter according to the state of the art such as that described in WO 01/43,847, in which the dirt cake profile in the melt channel is constant over time and the filter thus supplies a more-or-less similar signal for the required filter surface area per unit time.

In the case of other filter systems, this can also be derived purely theoretically from the increase in pressure per unit time, but this cannot be linked in a linear manner with the amount of dirt, so that a calculation of this type is theoretically very complicated and therefore cannot be carried out in practice. In the case of back-flush filters, furthermore, it cannot be carried out under any conditions, because the back-flushed screens are always in an undefined and also uncontrollable state.

LIST OF REFERENCE NUMBERS 1 device
2 feed unit
3 plasticizing unit
4 cleaning unit
5 screen disk
6 screen insert
7 plate-shaped body
8 plate-shaped body
9 cleaning channel
10 flow direction
11 access opening
12 axis
13 back-flush line
14 melt shot piston
15 counterflow direction
16 partial area
17 sensor unit
18 sensor unit
19 sensor unit
20 sensor unit
21 sensor unit
22 filter control
23 process control unit
24 actuator
25 actuator
26 actuator
27 actuator
28 quality management
29 process parameter
30 final product

The invention claimed is:

1. Process for preparing a melt, especially a plastic melt, with a device (2) for supplying material components to a unit (3) for plasticizing the components, where at least one cleaning unit (4) for the melt passing through, especially a rotating screen disk (5), and at least one sensor unit (17, 18, 19, 20, 21) for detecting one or more process parameters are provided, by means of which parameters and in the knowledge of the filter-specific process data the work of the cleaning unit (4) can be influenced, wherein, on the basis of the determined (17, 18, 19, 20, 21) process parameters and/or the filter-specific process data, the process materials being supplied by the feed device (2) can be controlled at least with respect to type and metering rate.

2. Process according to claim 1, wherein the processing parameters of the process materials are controlled on the basis of the determined (17, 18, 19, 20, 21) process parameters and/or the filter-specific process data.

3. Process according to claim 1, wherein the process parameters of a further-processing unit downstream from the cleaning unit (4), especially a chopper, a valve of a plastic processing machine, or the like, are controlled on the basis of determined (17, 18, 19, 20, 21) process parameters and/or the filter-specific process data.

4. Process according to claim 1, wherein the cleaning unit (4) and the feed unit (2) are controlled on the basis of the data in an interdependent manner.

5. Process according to claim 3, wherein the cleaning unit (4) and the process parameters are controlled on the basis of the data in an interdependent manner.

6. Process according to claim 1, wherein, on the basis of the determined process parameters and/or the filter-specific process data, information can be generated for quality management (28) and/or purchasing.

7. Device (1) for implementing the process according to claim 1, with a feed device (2) for material components connected to a plasticizing unit (3), where the device (1) has at least one cleaning unit (4) for the melt passing through, especially a rotating screen disk (5), and at least one sensor unit (17, 18, 19, 20, 21) for detecting one or more process parameters, by means of which parameter and in the knowledge of the filter-specific process data the work of the cleaning unit (4) can be influenced, wherein a process control unit (23) is provided, which, on the basis of the determined (17, 18, 19, 20, 21) process parameters and/or the filter-specific process data, controls the feed unit (2) at least with respect to the type and metering rate of the process materials being supplied.

8. Device (1) according to claim 7, wherein, on the basis of determined (17, 18, 19, 20, 21) process parameters and/or the filter-specific process data, the process control unit (23) controls the process parameters (29) of a further-processing unit downline from the cleaning unit (4), especially a chopper, a valve of a plastic processing machine, or the like.

* * * * *